US010823484B2

(12) United States Patent
Senf, Jr.

(10) Patent No.: US 10,823,484 B2
(45) Date of Patent: Nov. 3, 2020

(54) INTELLIGENT VOLTAGE CONTROL FOR ELECTRIC HEAT AND DEFROST IN TRANSPORT REFRIGERATION SYSTEM

(71) Applicant: CARRIER CORPORATION, Palm Beach Gardens, FL (US)

(72) Inventor: Raymond L. Senf, Jr., Central Square, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 92 days.

(21) Appl. No.: 16/096,094

(22) PCT Filed: May 2, 2017

(86) PCT No.: PCT/US2017/030613
§ 371 (c)(1),
(2) Date: Oct. 24, 2018

(87) PCT Pub. No.: WO2017/192568
PCT Pub. Date: Nov. 9, 2017

(65) Prior Publication Data
US 2019/0120539 A1  Apr. 25, 2019

Related U.S. Application Data

(60) Provisional application No. 62/330,965, filed on May 3, 2016.

(51) Int. Cl.
*F25D 21/08* (2006.01)
*F25D 11/00* (2006.01)
(Continued)

(52) U.S. Cl.
CPC ............. *F25D 21/08* (2013.01); *B60H 1/321* (2013.01); *B60H 1/3226* (2013.01);
(Continued)

(58) Field of Classification Search
CPC ...... F25D 11/003; F25D 21/006; F25D 21/08; F25D 29/003; B60H 1/321; B60H 1/3226;
(Continued)

(56) References Cited

U.S. PATENT DOCUMENTS 3,010,289 A   11/1961   Kuklinski
5,046,326 A    9/1991   Havemann et al.
(Continued)

FOREIGN PATENT DOCUMENTS

CA         1097403 A      3/1981
DE     102005042817 B3   12/2006
(Continued)

OTHER PUBLICATIONS

Notification of Transmittal of the International Search Report and the Written Opinion of the International Searching Authority, or the Declaration for International Application No. PCT/US2017/030613; dated Jul. 18, 2017; dated Jul. 20, 2017; 13 pages.

*Primary Examiner* — Marc E Norman
(74) *Attorney, Agent, or Firm* — Cantor Colburn LLP

(57) ABSTRACT

A method of operating a transport refrigeration system comprises: controlling, using a controller (30), a plurality of components of the refrigeration system and monitoring, using the controller, a plurality of operating parameters of the refrigeration system. The controlling comprises operating at least one of a prime mover (26), heater (48), and electric generation device (24). The operating parameters comprise at least one of a speed of the prime mover and a voltage of the electric generation device. The method comprises detecting, using the controller, when at least one of a heating mode and a defrost mode is required; activating, using the controller, the heater when at least one of the heating mode and the defrost mode is required; comparing, using the controller, the voltage of the electric generation (Continued)

device to a selected voltage; and controlling, using the controller, the speed of the prime mover in response to the voltage of the electric generation device.

20 Claims, 2 Drawing Sheets

(51) Int. Cl.
- B60H 1/32 (2006.01)
- B60P 3/20 (2006.01)
- F25D 21/00 (2006.01)
- F25D 29/00 (2006.01)

(52) U.S. Cl.
CPC .............. *B60H 1/3232* (2013.01); *B60P 3/20* (2013.01); *F25D 11/003* (2013.01); *F25D 21/006* (2013.01); *F25D 29/003* (2013.01); *F25B 2327/001* (2013.01); *F25B 2500/31* (2013.01); *F25B 2700/15* (2013.01); *F25D 2400/34* (2013.01)

(58) Field of Classification Search
CPC .... B60H 1/3232; B60P 3/20; F25B 2327/001; F25B 2700/15
See application file for complete search history.

(56) References Cited

U.S. PATENT DOCUMENTS

| | | | |
|---|---|---|---|
| 5,201,186 | A | 4/1993 | Hanson |
| 5,331,821 | A | 7/1994 | Hanson et al. |
| 5,408,836 | A | 4/1995 | Sjoholm et al. |
| 5,692,385 | A | 12/1997 | Hollenbeck et al. |
| 7,260,946 | B2 | 8/2007 | Ludwig et al. |
| 8,453,722 | B2 | 6/2013 | Zeigler et al. |
| 8,487,458 | B2 | 7/2013 | Steele et al. |
| 8,756,947 | B2 | 6/2014 | Chen et al. |
| 2013/0118196 | A1 | 5/2013 | Chen et al. |
| 2014/0137580 | A1* | 5/2014 | Peyaud ............ F25B 41/04 62/80 |
| 2014/0157818 | A1 | 6/2014 | Burchill |
| 2015/0168032 | A1 | 6/2015 | Steele |
| 2015/0352925 | A1 | 12/2015 | Olyleye et al. |

FOREIGN PATENT DOCUMENTS

| | | |
|---|---|---|
| EP | 0152121 A2 | 8/1985 |
| WO | 2010150469 A1 | 12/2010 |
| WO | 2014205095 A1 | 12/2014 |

* cited by examiner

INTELLIGENT VOLTAGE CONTROL FOR ELECTRIC HEAT AND DEFROST IN TRANSPORT REFRIGERATION SYSTEM

BACKGROUND OF THE DISCLOSURE

The embodiments herein generally relate to "all electric" transport refrigeration systems and more specifically, the heating and defrost modes of such systems.

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated trucks and trailers are commonly used to transport perishable goods in a cold chain distribution system. A transport refrigeration system is mounted to the truck or to the trailer in operative association with a cargo space defined within the truck or trailer for maintaining a controlled temperature environment within the cargo space.

Conventionally, transport refrigeration systems used in connection with refrigerated trucks and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated trucks and refrigerated trailers, the compressor, and typically other components of the transport refrigeration unit, must be powered during transit by a prime mover. In the case of refrigerated trailers, the prime mover typically comprises a diesel engine carried on and considered part of the transport refrigeration system. In mechanically driven transport refrigeration systems the compressor is driven by the diesel engine, either through a direct mechanical coupling or a belt drive, and other components, such as the condenser and evaporator fans are belt driven.

An "all electric" transport refrigeration system for a refrigerated trailer application is also commercially available through Carrier Corporation. In the all electric transport refrigeration system, a prime mover, most commonly a diesel engine, carried on and considered part of the transport refrigeration system, drives an AC synchronous generator that generates AC power. The generated AC power is used to power an electric compressor motor for driving the refrigerant compressor of the transport refrigeration unit and also powering electric AC fan motors for driving the condenser and evaporator motors and electric heaters associated with the evaporator. For example, U.S. Pat. No. 6,223,546 discloses an all electric transport refrigeration system.

Some transport refrigeration systems incorporate a heater to provide both heating and defrost to the transport refrigeration unit. The operation of the heater is tied directly to two speed settings of the prime mover, generally a high speed and a low speed. Operating the heater at only two speeds of the prime mover promotes inefficient use of the heater.

BRIEF DESCRIPTION OF THE DISCLOSURE

According to one embodiment, a method of operating a transport refrigeration system is provided. The method comprises: controlling, using a controller, a plurality of components of the refrigeration system. The controlling comprises operating at least one of a prime mover, a heater, and an electric generation device. The method also comprises: monitoring, using the controller, a plurality of operating parameters of the refrigeration system. The operating parameters comprise at least one of a speed of the prime mover and a voltage of the electric generation device. The method further comprises: detecting, using the controller, when at least one of a heating mode and a defrost mode is required; activating, using the controller, the heater when at least one of the heating mode and the defrost mode is required; comparing, using the controller, the voltage of the electric generation device to a selected voltage; and controlling, using the controller, the speed of the prime mover in response to the voltage of the electric generation device.

In addition to one or more of the features described above, or as an alternative, further embodiments of the method may include detecting, using the controller, when the voltage of the electric generation device less than the selected voltage.

In addition to one or more of the features described above, or as an alternative, further embodiments of the method may include increasing, using the controller, the speed of the prime mover until the voltage of the electric generation device equals the selected voltage.

In addition to one or more of the features described above, or as an alternative, further embodiments of the method may include increasing, using a controller, the speed of the prime mover by a selected speed increment.

In addition to one or more of the features described above, or as an alternative, further embodiments of the method may include detecting, using the controller, when the heating mode and the defrost mode is still required; comparing, using the controller, the voltage of the electric generation device to the selected voltage; detecting, using the controller, when the voltage of the electric generation device less than the selected voltage; and increasing, using the controller, the speed of the prime mover by the selected speed increment when the voltage of the electric generation device less than the selected voltage.

In addition to one or more of the features described above, or as an alternative, further embodiments of the method may include detecting, using the controller, when the voltage of the electric generation device is equal to the selected voltage; and maintaining, using the controller, the speed of the prime mover.

In addition to one or more of the features described above, or as an alternative, further embodiments of the method may include detecting, using the controller, when the voltage of the electric generation device is greater than the selected voltage; and decreasing, using the controller, the speed of the prime mover.

According to another embodiment, controller of a transport refrigeration system is provided. The controller comprises: a processor; and a memory comprising computer-executable instructions that, when executed by the processor, cause the processor to perform operations. The operations comprising: controlling a plurality of components of the refrigeration system. The controlling comprises operating at least one of a prime mover, a heater, and an electric generation device. The operations also comprise monitoring a plurality of operating parameters of the refrigeration system. The operating parameters comprise at least one of a speed of the prime mover and a voltage of the electric generation device. The operations further comprise detecting when at least one of a heating mode and a defrost mode is required; activating the heater when at least one of the heating mode and the defrost mode is required; comparing the voltage of the electric generation device to a selected voltage; and controlling the speed of the prime mover in response to the voltage of the electric generation device.

In addition to one or more of the features described above, or as an alternative, further embodiments of the controller may include detecting when the voltage of the electric generation device less than the selected voltage.

In addition to one or more of the features described above, or as an alternative, further embodiments of the controller may include increasing the speed of the prime mover until the voltage of the electric generation device equals the selected voltage.

In addition to one or more of the features described above, or as an alternative, further embodiments of the controller may include increasing the speed of the prime mover by a selected speed increment.

In addition to one or more of the features described above, or as an alternative, further embodiments of the controller may include detecting when the heating mode and the defrost mode is still required; comparing the voltage of the electric generation device to the selected voltage; detecting when the voltage of the electric generation device less than the selected voltage; and increasing the speed of the prime mover by the selected speed increment when the voltage of the electric generation device less than the selected voltage.

In addition to one or more of the features described above, or as an alternative, further embodiments of the controller may include detecting when the voltage of the electric generation device is equal to the selected voltage; and maintaining the speed of the prime mover.

In addition to one or more of the features described above, or as an alternative, further embodiments of the controller may include detecting when the voltage of the electric generation device is greater than the selected voltage; and decreasing the speed of the prime mover.

According to another embodiment, a computer program product tangibly embodied on a computer readable medium, the computer program product including instructions that, when executed by a processor, cause the processor to perform operations is provided. The operations comprise: controlling a plurality of components of the refrigeration system. The controlling comprises operating at least one of a prime mover, a heater, and an electric generation device. The operations also comprise monitoring a plurality of operating parameters of the refrigeration system. The operating parameters comprise at least one of a speed of the prime mover and a voltage of the electric generation device. The operations further comprise detecting when at least one of a heating mode and a defrost mode is required; activating the heater when at least one of the heating mode and the defrost mode is required; comparing the voltage of the electric generation device to a selected voltage; and controlling the speed of the prime mover in response to the voltage of the electric generation device.

In addition to one or more of the features described above, or as an alternative, further embodiments of the computer program may include that the operations further comprise detecting when the voltage of the electric generation device less than the selected voltage.

In addition to one or more of the features described above, or as an alternative, further embodiments of the computer program may include that the operations further comprise increasing the speed of the prime mover until the voltage of the electric generation device equals the selected voltage.

In addition to one or more of the features described above, or as an alternative, further embodiments of the computer program may include that the operations further comprise increasing the speed of the prime mover by a selected speed increment.

In addition to one or more of the features described above, or as an alternative, further embodiments of the computer program may include that the operations further comprise detecting when the heating mode and the defrost mode is still required; comparing the voltage of the electric generation device to the selected voltage; detecting when the voltage of the electric generation device less than the selected voltage; and increasing the speed of the prime mover by the selected speed increment when the voltage of the electric generation device less than the selected voltage.

In addition to one or more of the features described above, or as an alternative, further embodiments of the computer program may include that the operations further comprise detecting when the voltage of the electric generation device is equal to the selected voltage; and maintaining the speed of the prime mover.

In addition to one or more of the features described above, or as an alternative, further embodiments of the computer program may include that the operations further comprise detecting when the voltage of the electric generation device is greater than the selected voltage; and decreasing the speed of the prime mover.

Technical effects of embodiments of the present disclosure include controlling a prime mover of a transport refrigeration system in response to a voltage of an electric generation device in at least one of a heating mode and a defrost mode. Further technical effects include increasing the speed of the prime mover until the voltage of the electric generation device equals a selected voltage.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION OF THE DISCLOSURE

Figure 1:
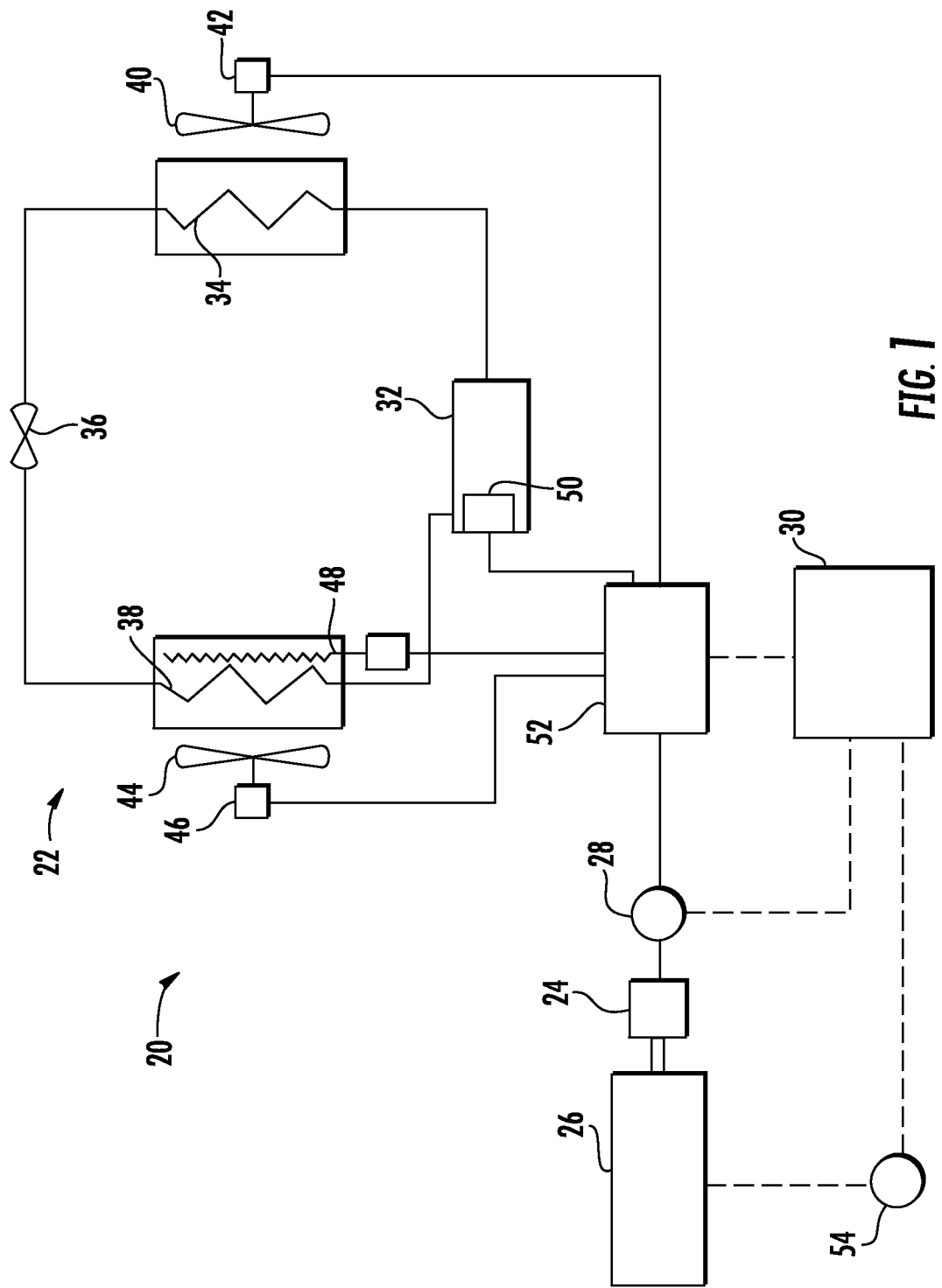
FIG. 1 is a schematic illustration of a transport refrigeration system in accordance with the disclosure.

Referring to FIG. 1, a transport refrigeration system 20 includes a refrigeration unit 22, an electric generation device 24, a prime mover 26 for driving the electric generation device 24, and a controller 30. The refrigeration unit 22 functions, under the control of the controller 30, to establish and regulate a desired product storage temperature within a refrigerated cargo space wherein a perishable product is stored during transport and to maintain the product storage temperature within a specified temperature range. The refrigerated cargo space may be the cargo box of a trailer, a truck, a seaboard shipping container or an intermodal container wherein perishable cargo, such as, for example, produce, meat, poultry, fish, dairy products, cut flowers, and other fresh or frozen perishable products, is stowed for transport.

The transport refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The refrigeration unit 22 may also include an electric resistance heater 48 associated with the refrigerant heat absorption heat exchanger 38. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes extending between respective inlet and outlet manifolds. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending between respective inlet and outlet manifolds. The fan(s) 44 are operative to pass air drawn from the temperature controlled cargo box across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the temperature controlled cargo box. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

The refrigerant compression device 32 may comprise a single-stage or multiple-stage compressor such as, for example, a reciprocating compressor or a scroll compressor. The compression device 32 has a compression mechanism (not shown) driven by an electric motor 50. In an embodiment, the motor 50 may be disposed internally within the compressor with a drive shaft interconnected with a shaft of the compression mechanism, all sealed within a common housing of the compression device 32.

The refrigeration system 20 also includes a controller 30 configured for controlling operation of the refrigeration system 20 including, but not limited to, operation of various components of the refrigerant unit 22 to provide and maintain a desired thermal environment within the cargo box of the truck or trailer, that is within the temperature controlled space in which a perishable product is stowed. The controller 30 may be an electronic controller including a microprocessor and an associated memory bank. The controller 30 controls operation of various components of the refrigerant unit 22, such as the refrigerant compression device 32 and its associated drive motor 50, the fan motors 42, 46 and the electric resistance heater 48. The controller 30 may also be able to selectively operate the prime mover 26, typically through an electronic engine controller 54 operatively associated with the prime mover 26.

The refrigeration unit 22 has a plurality of power demand loads, including, but not limited to, the compression device drive motor 50, the drive motor 42 for the fan 40 associated with the refrigerant heat rejection heat exchanger 34, and the drive motor 46 for the fan 44 associated with the refrigerant heat absorption heat exchanger 38. In the depicted embodiment, the electric resistance heater 48 also constitutes a power demand load. The electric resistance heater may be selectively operated by the controller 30 whenever a control temperature within the temperature controlled cargo box drops below a preset lower temperature limit, which may occur in a cold ambient environment. In such an event the controller 30 would activate the electric resistance heater 48 to heat air circulated over the electric resistance heater by the fan(s) 44 associated with the refrigerant heat absorption heat exchanger 38.

The prime mover 26, which comprises an on-board fossil-fuel engine, most commonly a diesel engine, drives the electric generation device 24 that generates electrical power. The drive shaft of the engine drives the shaft of the electric generation device 24. In an electrically powered embodiment of the transport refrigeration unit 20, the electric generation device 24 may comprise a single on-board, engine driven AC generator configured to generate alternating current (AC) power including at least one AC voltage at one or more frequencies. In an embodiment, the electric generation device 24 may, for example, be a permanent magnet AC generator or a synchronous AC generator. In another embodiment, the electric generation device 24 may comprise a single on-board, engine driven DC generator configured to generate direct current (DC) power at at least one voltage. Some electric generation devices may have internal voltage regulators while other electric generation devices do not. In another embodiment, the electric generation device 24 does not contain an internal voltage regulator and thus the voltage of the electric generation device 24 is unregulated by the electric generation device 23 itself. The refrigeration system 20 has a voltage sensor 28 to sense the voltage of the electric generation device 24. As each of the fan motors 42, 46 and the compression device drive motor 50 may be an AC motor or a DC motor, it is to be understood that various power converters 52, such as AC to DC rectifiers, DC to AC inverters, AC to AC voltage/frequency converters, and DC to DC voltage converters, may be employed in connection with the electric generation device 24 as appropriate.

Some current all-electric refrigeration units operate the prime mover at two speeds, a low speed and a high speed. When increased cooling is required, the prime mover operates at high speed. Once the need for increased cooling has diminished, the controller will then move the prime mover back down to low speed. This two speed system translates over to the operation of a defrost mode and a heating mode of the refrigeration unit. As discussed above, the prime mover will generate power through the electrical generation device to power the heater in both heating and defrost mode; however when the prime mover is only operating at two velocities, only two voltages outputs from the electrical generation device are available to the heater. Thus, the heater only operates at two voltages in some refrigeration systems. Operating the heater at only two voltages based on the two speeds of the prime mover promotes inefficient use of the heater because the refrigeration unit is not taking advantage of the maximum heat output of the heater, which leads to longer heating and defrost modes at lower heat. Subsequently, longer heating and defrost modes leads to longer periods where the refrigeration unit is not cooling the cargo because the cooling function of the refrigeration unit must be turned off in order for the heating and defrost modes to operate properly. Advantageously, operating the speed of prime mover 26 in response to the voltage of the electric generation device 24 will lead to more efficient use of the heater 48, as described further below.

Figure 2:
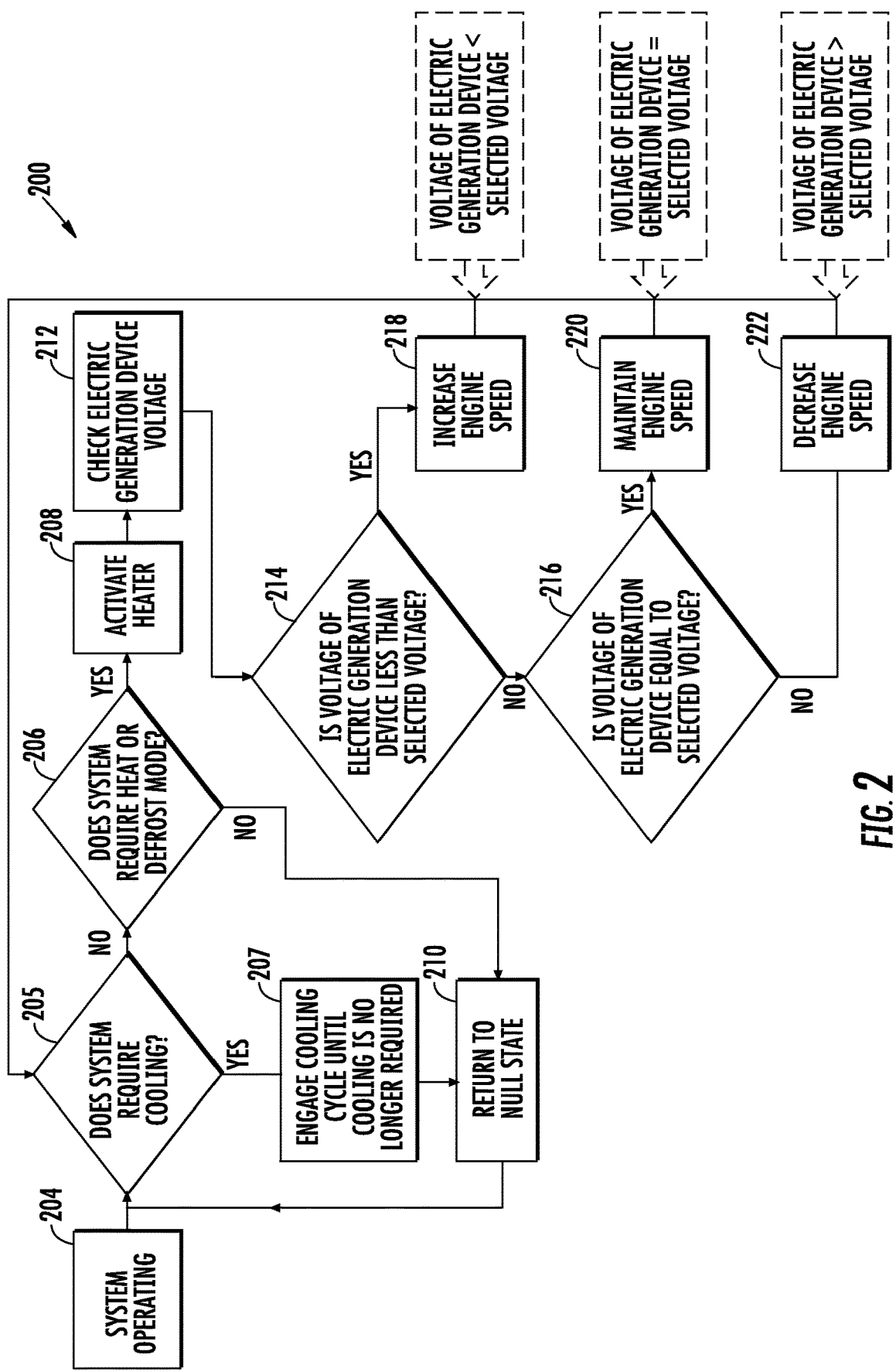
FIG. 2 is a flow diagram illustrating a method of operating a refrigeration system.

Referring now also to FIG. 2, which shows a flow diagram illustrating a method 200 of operating a refrigeration system 30. The method 200 begins at block 204 with the transport refrigeration system 20 in operation. While in operation, the controller 30 controls a plurality of components of the refrigeration unit 22. In an embodiment, controlling comprises operating at least one of the prime mover 26, the heater 48, and the electric generation device 24. The controller 30 may also monitor a plurality of operating parameters of the refrigeration system 20. In an embodiment, the operating parameters comprise at least one of a speed of the prime mover 26, and a voltage of the electric generation device 24. During operation, the method 200 may include an optional check at block 205 to determine whether cooling is required in the refrigerated cargo space. If cooling is required then the controller 30 may engage the cooling cycle of the refrigeration system at block 207 and then move into a null state at block 310 when cooling is no longer required. If cooling is not required at block 205 then the method 200 may move to block 206 for the controller 30 to detect whether at least one of a heating mode and a defrost mode at block 206 is required. Heating mode may be required if the temperature needs to be raised in the refrigerated cargo space. In heating mode, the heater 48 will activate and the fan 44 will remain running to blow air over the heater 48 and into the refrigerated cargo space. Defrost mode may be required in an instance for example where ice has begun to form on the refrigerant heat absorption heat exchanger 38. The ice formation may be detected by various methods, including but not limited to detecting a change in the volume of air flow across the refrigerant heat absorption heat exchanger 38. For instance, ice formation will reduce the volume air flow across the refrigerant heat absorption heat exchanger 38. In defrost mode, the fan 44 will turn off and the heater 48 will heat refrigerant heat absorption heat exchanger 38 to defrost the ice.

If the heating mode and the defrost mode are not required, the controller will move the transport refrigeration system 20 to a null state at block 210. While in the null state, for a selected period of time, the transport refrigeration system 20 will continue to cool the refrigerated cargo space until it moves to block 206 again to check to see if the refrigerated system 20 requires the heating mode or defrost mode. Once the controller 30 detects that a heating mode or a defrost mode is required at block 206, the controller 30 will activate the heater 48 at block 208. Next at block 212, the controller 30 will check the voltage of the electric generation device 24 and then compare the voltage of the electric generation device 24 to a selected voltage at block 214. The selected voltage of the electric generation device may be the maximum heating voltage of the heater 48 and/or a control limit voltage for the heater 48. Advantageously, allowing the heater 48 to get to its maximum heating voltage will shorten the defrost mode and heating mode. This in turn improves overall efficiency of the refrigeration system 20. The controller 30 will control the speed of the prime mover 26 in response to the comparison of the voltage of the electric generation device 24 to a selected voltage at block 214.

If the controller 30 detects that the voltage of the electric generation device 24 is not less than the selected voltage (i.e. the voltage is greater than or equal to the selected voltage) then the control 30 will check if the voltage of the electric generation device 24 is equal to the selected voltage at block 216. If the voltage of the electric generation device 24 is equal to the selected voltage then the controller 30 maintains the speed of the prime mover 26 at block 220 and then returns the method 200 back to block 206. If the voltage of the electric generation device 24 is not equal to the selected voltage at block 216 (i.e. greater than the selected voltage) then the controller 30 decrease the speed of the prime mover 26 at block 222 and then returns the method 200 back to block 206. Decreasing the voltage at block 222 helps avoid exceeding the maximum voltage limits of the heater 48.

If the controller 30 detects that the voltage of the electric generation device 24 less than the selected voltage then the controller 30 increases the speed of the prime mover 26 at block 218. The controller 30 may increase the speed of the prime mover 26 as a proportional integral derivative (PID) system, where the speed of the prime mover 26 is increased until the voltage of the electric generation device 24 equals the selected voltage. Alternatively, the controller 30 may increase the speed of the prime mover 26 by a selected speed increment. In the event the controller 30 increases the speed of the prime mover 26 by a selected speed increment, the method 200 will then have to return to block 206 to re-detect if the heating mode and the defrost mode is still required; compare the voltage of the electric generation device 24 to the selected voltage; redetect if the voltage of the electric generation device 24 less than the selected voltage; and re-increasing the speed of the prime mover 26 by the selected speed increment if required.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of operating a transport refrigeration system, the method comprising:
controlling, using a controller, a plurality of components of the refrigeration system, wherein controlling comprises operating at least one of a prime mover, a heater, or an electric generation device;
monitoring, using the controller, a plurality of operating parameters of the refrigeration system, wherein the operating parameters comprise at least one of a speed of the prime mover or a voltage of the electric generation device;
detecting, using the controller, when at least one of a heating mode or a defrost mode is required;
activating, using the controller, the heater when at least one of the heating mode or the defrost mode is required, wherein the heater is powered by the voltage of the electric generation device;
comparing, using the controller, the voltage of the electric generation device to a selected voltage of the electric generation device, wherein the selected voltage of the electric generation device is a maximum heating voltage of the heater or a control limit voltage for the heater; and
controlling, using the controller, the speed of the prime mover in response to the voltage of the electric generation device to allow the heater to receive the maximum heating voltage of the heater or the control limit voltage for the heater.

2. The method of claim 1, further comprising:
detecting, using the controller, when the voltage of the electric generation device less than the selected voltage.

3. The method of claim 2, further comprising:
increasing, using the controller, the speed of the prime mover until the voltage of the electric generation device equals the selected voltage.

4. The method of claim 2, further comprising:
increasing, using a controller, the speed of the prime mover by a selected speed increment.

5. The method of claim 4, further comprising:
detecting, using the controller, when the heating mode and the defrost mode is still required;
comparing, using the controller, the voltage of the electric generation device to the selected voltage;
detecting, using the controller, when the voltage of the electric generation device less than the selected voltage; and
increasing, using the controller, the speed of the prime mover by the selected speed increment when the voltage of the electric generation device less than the selected voltage.

6. The method of claim 1, further comprising:
detecting, using the controller, when the voltage of the electric generation device is equal to the selected voltage; and
maintaining, using the controller, the speed of the prime mover.

7. The method of claim 1, further comprising:
detecting, using the controller, when the voltage of the electric generation device is greater than the selected voltage; and
decreasing, using the controller, the speed of the prime mover.

8. A controller of a transport refrigeration system comprising:
a processor;
a memory comprising computer-executable instructions that, when executed by the processor, cause the processor to perform operations, the operations comprising:
controlling a plurality of components of the refrigeration system, wherein controlling comprises operating at least one of a prime mover, a heater, or an electric generation device;
monitoring a plurality of operating parameters of the refrigeration system, wherein the operating parameters comprise at least one of a speed of the prime mover and a voltage of the electric generation device;
detecting when at least one of a heating mode end or a defrost mode is required;
activating the heater when at least one of the heating mode or the defrost mode is required, wherein the heater is powered by the voltage of the electric generation device;
comparing the voltage of the electric generation device to a selected voltage of the electric generation device, wherein the selected voltage of the electric generation device is a maximum heating voltage of the heater or a control limit voltage for the heater; and
controlling the speed of the prime mover in response to the voltage of the electric generation device to allow the heater to receive the maximum heating voltage of the heater or the control limit voltage for the heater.

9. The controller of claim 8, wherein the operations further comprise:
detecting when the voltage of the electric generation device less than the selected voltage.

10. The controller of claim 9, wherein the operations further comprise:
increasing the speed of the prime mover until the voltage of the electric generation device equals the selected voltage.

11. The controller of claim 9, wherein the operations further comprise:
increasing the speed of the prime mover by a selected speed increment.

12. The controller of claim 11, wherein the operations further comprise:
detecting when the heating mode and the defrost mode is still required;
comparing the voltage of the electric generation device to the selected voltage;
detecting when the voltage of the electric generation device less than the selected voltage; and
increasing the speed of the prime mover by the selected speed increment when the voltage of the electric generation device less than the selected voltage.

13. The controller of claim 8, wherein the operations further comprise:
detecting when the voltage of the electric generation device is equal to the selected voltage; and
maintaining the speed of the prime mover.

14. The controller of claim 8, wherein the operations further comprise:
detecting when the voltage of the electric generation device is greater than the selected voltage; and
decreasing the speed of the prime mover.

15. A computer program product tangibly embodied on a computer readable medium, the computer program product including instructions that, when executed by a processor, cause the processor to perform operations comprising:

controlling a plurality of components of the refrigeration system, wherein controlling comprises operating at least one of a prime mover, a heater, or an electric generation device;

monitoring a plurality of operating parameters of the refrigeration system, wherein the operating parameters comprise at least one of a speed of the prime mover and or a voltage of the electric generation device;

detecting when at least one of a heating mode or a defrost mode is required;

activating the heater when at least one of the heating mode or the defrost mode is required, wherein the heater is powered by the voltage of the electric generation device;

comparing the voltage of the electric generation device to a selected voltage of the electric generation device, wherein the selected voltage of the electric generation device is a maximum heating voltage of the heater or a control limit voltage for the heater; and controlling the speed of the prime mover in response to the voltage of the electric generation device to allow the heater to receive the maximum heating voltage of the heater or the control limit voltage for the heater.

16. The computer program of claim 15, wherein the operations further comprise:

detecting when the voltage of the electric generation device less than the selected voltage.

17. The computer program of claim 16, wherein the operations further comprise:

increasing the speed of the prime mover until the voltage of the electric generation device equals the selected voltage.

18. The computer program of claim 16, wherein the operations further comprise:

increasing the speed of the prime mover by a selected speed increment.

19. The computer program of claim 18, wherein the operations further comprise:

detecting when the heating mode and the defrost mode is still required;

comparing the voltage of the electric generation device to the selected voltage;

detecting when the voltage of the electric generation device less than the selected voltage; and increasing the speed of the prime mover by the selected speed increment when the voltage of the electric generation device less than the selected voltage.

20. The computer program of claim 15, wherein the operations further comprise:

detecting when the voltage of the electric generation device is equal to the selected voltage; and maintaining the speed of the prime mover.

\* \* \* \* \*